United States Patent [19]

Unterlass et al.

[11] Patent Number: 5,392,184

[45] Date of Patent: Feb. 21, 1995

[54] METHOD AND APPARATUS FOR RELIEVING A CAPACITOR OF A CONTROLLED SERIES COMPENSATOR AS A FUNCTION OF THE LOAD ON ITS ARRESTER

[75] Inventors: Franz-Josef Unterlass, Adelsdorf; Stephan Weiss, Bad Mergentheim, both of Germany

[73] Assignee: Siemens Aktiengesellschaft, München, Germany

[21] Appl. No.: 63,381

[22] Filed: May 18, 1993

[30] Foreign Application Priority Data

May 20, 1992 [EP] European Pat. Off. ............ 92108539

[51] Int. Cl.⁶ .............................................. H02H 7/16
[52] U.S. Cl. ............................................. 361/16; 361/15
[58] Field of Search ........................ 361/15, 16, 17, 24, 361/25; 323/210, 209, 211

[56] References Cited

U.S. PATENT DOCUMENTS

| | | |
|---|---|---|
| 4,482,930 | 11/1984 | Peterson et al. ............... 361/16 |
| 4,703,385 | 10/1987 | Stenström ...................... 361/16 |
| 4,999,565 | 3/1991 | Nilsson ........................... 323/210 |

FOREIGN PATENT DOCUMENTS

WO8704538 7/1987 WIPO .

OTHER PUBLICATIONS

Thumm, G. et al., "Geregelte Parallel—und Reihenkompensation", Ekektrie, vol. 45, No. 3, Mar. 1991, Berlin, DE, pp. 88–90.
EPRI Workshop, Nov. 14–16, 1990, Cincinnati, Ohio, Siemens, Munich, Germany: Advanced Series Compensation with Variable Impedance, 13 pages.
Müller, Ing. Leonhard, "Reihenkondensatoren In Elektrischen Netzen" (Series Capacitors in Electric Networks), 1967, Chaper A, pp. 1–4.
IEEE Transactions on Power Delivery, vol. 4, No. 2 Apr. 1989, New York, US, pp. 1369–1378, M. Adolfson et al.: *EHV Series Capacitor Banks. A New Approach To Platform to Ground Signalling Relay Protection and Supervision.*

*Primary Examiner*—A. D. Pellinen
*Assistant Examiner*—Sally Medley
*Attorney, Agent, or Firm*—Kenyon & Kenyon

[57] ABSTRACT

A method and an apparatus for relieving a capacitor of a controlled series compensator as a function of the load on its arrester when high-current line faults occur. The current flowing through the arrester is used to determine its absorbed energy, from which a temperature gradient is then determined as an indicator of a sudden load on the arrester and compared with a limit value. This comparison value is processed, as a function of the determined actual arrester temperature and the measured line current, to yield a control signal. The power converter valve of the controlled series compensator is triggered in response to this control signal in such a way that its equivalent impedance is switched from capacitive to inductive. The number of disconnections required as a result of high-current line faults is thereby considerably reduced, thus greatly increasing availability of the system.

15 Claims, 3 Drawing Sheets

METHOD AND APPARATUS FOR RELIEVING A CAPACITOR OF A CONTROLLED SERIES COMPENSATOR AS A FUNCTION OF THE LOAD ON ITS ARRESTER

BACKGROUND OF THE INVENTION

The present invention relates to a method and an apparatus for relieving a capacitor of a controlled series compensator as a function of the load on its arrester when high-current line faults occur.

In series compensation, capacitors are usually used in the line section in order to reduce the transmission angle, and the current-related voltage drop on the line, in stages. These are capacitor banks that are connected to and disconnected from the system either as a group or as a plurality of subcapacitors (segments) in series. The capacitor is connected and disconnected by opening or closing a parallel circuit breaker. Protection for the capacitor in the event of a network short circuit is provided by a parallel arrester, a triggerable spark gap, and/or the parallel circuit breaker.

A series compensation system may be used in which, by means of an inductor wired in parallel with the capacitor, the total impedance of the series compensator, by analogy with the TCR (thyristor controlled reactor) in a static compensator, is steplessly controlled with a power converter valve at high voltage by firing appropriately. A series compensator controlled in this manner is known as an ASC (advanced series compensator). With a series compensator controlled in this manner, the dynamics of series compensation can be improved and the total impedance is controllable within a certain range. Additionally, the impedance can be changed from capacitative to inductive.

Series compensators of this type are described in the article "Regulated Parallel and Series Compensators," printed in the German journal "Elektrie," volume 45, March 1991, pages 88–90. A series compensator of this type that is integrated into a transmission line is also described in the international patent document WO 87/04538.

One essential component in protecting the series capacitor of the controlled series compensator is non-linear resistors, also called arresters, for example MOVs (metal oxide varistors), which are connected electrically parallel to the series capacitor. These attesters are dimensioned so that at a given voltage they very quickly conduct current and thereby protect the series capacitor from longer-duration overload conditions.

For economic reasons, its energy absorption capacity is of course limited, and therefore a series compensation system also needs the ability to close a parallel bypass rapidly in order to protect the series capacitor and the arrester from overloads. This bypass has a circuit breaker or a spark gap and a damping circuit. The purpose of this damping circuit is to damp discharge effects that can occur in the event of line faults after the bypass closes.

In previous controlled series compensation systems for high-voltage electrical lines the series compensation systems needed to be shorted out, i.e. disconnected, in the event of high-current faults in order to provide protection against overload for the installed operating means needed for the purpose.

Each disconnection of the controlled series compensator reduces the availability, of the series compensation system and therefore the profitability of that system.

SUMMARY OF THE INVENTION

The present invention relates to a method and an apparatus with which the number of disconnections required in a controlled series compensator is considerably reduced, and the availability, is thus considerably increased. The causes of such disconnections are high-current line faults that must be detected sufficiently quickly.

The line current of a controlled, series-compensated line is not suitable for the purpose, since the signal-to-noise ratio of a line fault does not provide rapid, unequivocal information as to the load on the arrester. The capacitor voltage and the capacitor current of a controlled series-compensated line are equally unsuitable, since they may also not be sinusoidal and thus the two signals may not be easy to describe and analyze quickly.

The method and apparatus according to the present invention includes determining the arrester temperature gradient by means of a measured actual value for the current through the arrester. This provides an indication of the load on the arrester in the presence of high-current line faults. This arrester temperature gradient can also be processed quickly and accurately, making a control signal available which is correlated with an increased load on the arrester and which influences a control device for the power converter valve of the controllable inductance in such a way that the control device emits a control signal with a delay angle alpha=90°. As a result, the effective total impedance of the controlled series compensator is quickly changed from capacitative to inductive, electrically prolonging the transmission line and thereby reducing the high-current line fault. As a consequence of the reduction in the high-current line fault, the capacitor and arrester are no longer so severely loaded, so that the compensation system does not need to be disconnected.

Since the present invention allows the load on the arrester to be determined at any time from a current measurement, it can thus be evaluated in such a way that when an allowable load is exceeded, the controlled series compensation system is operated so that its total impedance is quickly modified from capacitative to inductive. This reduces the number of required disconnections of the controlled series compensation system, thus considerably increasing availability.

When an increased load on the arrester is detected as a consequence of an excess current or a short circuit, a control signal is generated that is conveyed to the firing-circuit subassembly of the controlled series compensator, thus triggering the power converter valve with a delay angle alpha=90°. The result of this is that the total impedance changes from capacitative to inductive, thus limiting or reducing the excess current or short-circuit current as a function of the inductance of the controlled coil.

Advantageous embodiments of the method and the apparatus according to the present invention are evident from the following description, the drawings and the claims.

For further elucidation of the method and apparatus according to the present invention which allows for relieving the capacitor of a controlled series compensator as a function of the load on its arrester, reference is made to the drawings, in which an exemplary embodiment of an apparatus according to the present invention is illustrated schematically.

DETAILED DESCRIPTION

Figure 1:
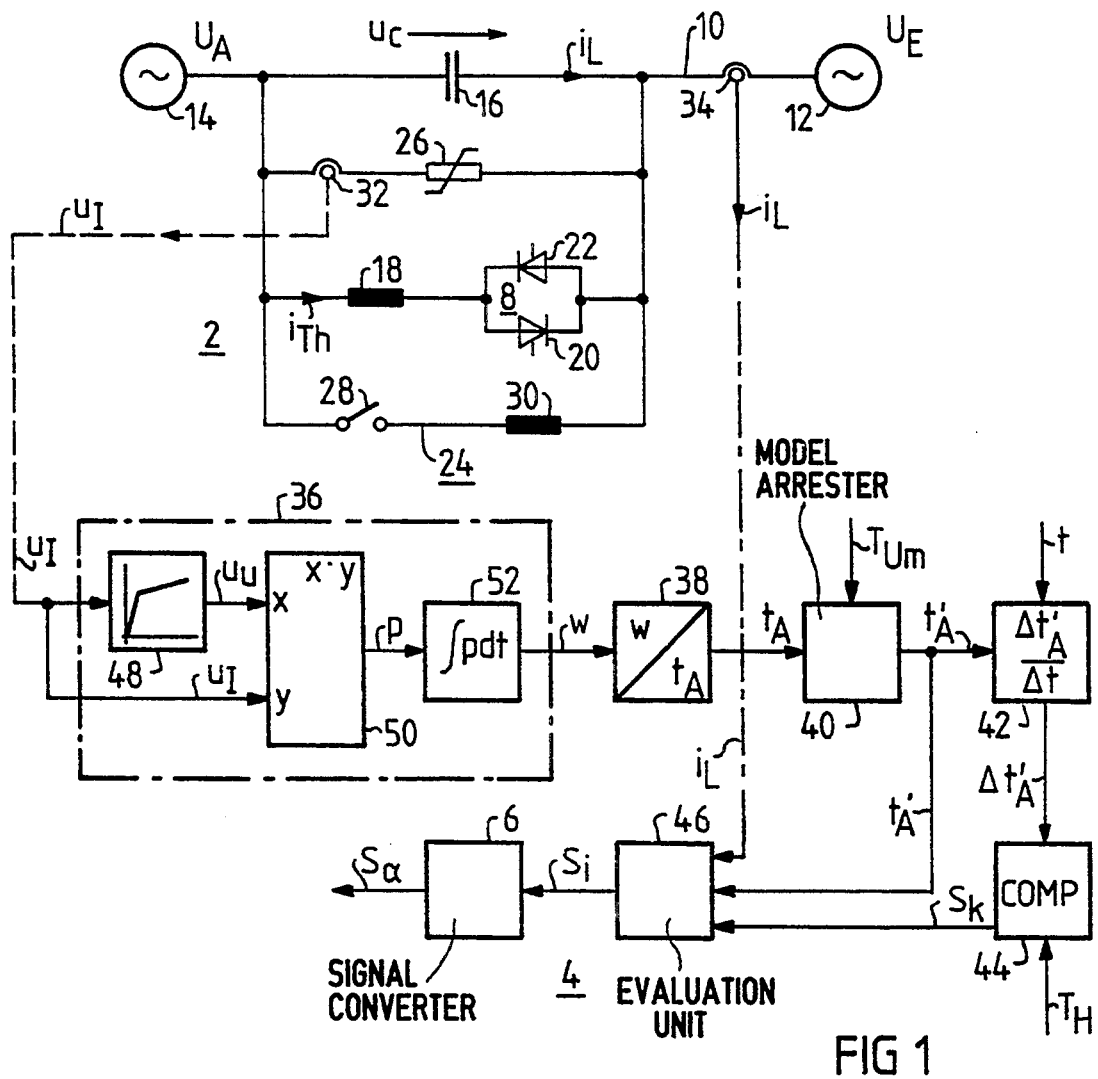
FIG 1 illustrates a controlled series compensator with a block diagram of the apparatus for relieving the capacitor according to an embodiment of the present invention.

FIG. 1 illustrates an equivalent circuit diagram of a controlled series compensator 2 with a device 4 for generating a control signal $S_i$, which is depicted as a block diagram. Device 4 is connected at the output side to a signal converter 6 that supplies a firing angle signal $S_{alpha}$ to a firing-circuit subassembly (not depicted in detail). The firing-circuit subassembly ensures time-synchronized triggering of power converter valve 8 of controlled series compensator 2. Controlled series compensator 2, also known as an ASC (advanced series compensator), is inserted as a series resistor in a transmission line 10. In most cases this is done along line 10, but can also occur at the output from or input to switching substations. Indicated at the beginning and end of the transmission line 10 are voltage sources 12 and 14, respectively, whose voltages $U_E$ and $U_A$ differ in amplitude by a line voltage drop $\Delta U$, and are phase shifted by a voltage torsion angle $N^G$. Voltage $U_A$ at the beginning of the line is also referred to as transmitting voltage $U_A$, and voltage $U_E$ at the end of the line is also referred to as load voltage $U_E$.

The configuration of a controlled series compensation system 2 can be divided into three sectors. The core of such a system 2 consists of a capacitor 16 that is serially integrated into transmission line 10. This produces compensation for the inductive longitudinal impedance of line 10, which is responsible for the inductive reactive power component. Also present in parallel in controlled series compensation system 2 is a branch consisting of a reactor 18 and a power converter valve 8. The power converter valve 8 illustrated in FIG. 1 is a parallel circuit containing two thyristors 20 and 22, arranged antiparallel to one another. These two thyristors 20 and 22 allow reactor 18 to be switched on at predetermined times for the positive and negative halfwaves of the capacitor voltage. Other semiconductor valve, for example GTO (gate turn-off) thyristors, can also be used instead of thyristors 20 and 22. With this branch, it is possible to modify the effective impedance of controlled series compensator 2 continuously between capacitative and inductive impedance by means of a phase-angle system. This makes it possible not only to increase transmission performance, but also to limit any short circuit current on line 10 in the event of a fault. The advantages of the use of series capacitors enumerated in the textbook entitled "Series Capacitors in Electrical Power Networks" by Dr.-Ing. Leonhard Müller, 1967, page 4, also apply to a controlled series compensator such as controlled series compensator 2.

To protect capacitor 16, reactor 18, and power converter valve 8 from overloads caused by excessive line currents $i_L$, a bypass element 24 and a nonlinear resistance element 26, also called a arrester, are installed in parallel with capacitor 16 and the series combination of reactor 18 and converter valve 8. A metal oxide varistor (MOV) can, for example, be provided as nonlinear resistance 26. This metal oxide varistor 26, installed electrically parallel to series capacitor 16, is dimensioned so that at a predetermined voltage amplitude, arrester 26 very quickly conducts current and thus protects series capacitor 16 from long-duration overload conditions. The energy absorption capacity of a nonlinear resistance 26 is of course limited by economic considerations. Therefore, series compensation system 2 must also protect series capacitor 16 and its arrester 26 from overloads. This task is performed by parallel bypass element 24. This bypass element 24 consists of a bypass switch 28 and a damping circuit 30. A triggerable spark gap can also be provided, as can a combination of the two. Bypass switch 28 closes as soon as the load capacity, i.e. the energy absorption capacity, of arrester 26 has been exceeded. The purpose of damping circuit 30 is to damp discharge defects that can occur in the event of line faults after the bypass closes.

An actual current determination device 32 determines the actual value of current $u_f$ through arrester 26, and an actual line current measuring device 34 measures the actual value of line current $i_L$ in line 10. These system variables $u_f$ and $i_L$ are conveyed in a voltage-free manner by a fiber optic system from system 2 (which is at high voltage) to device 4 (which is at ground potential), to generate a control signal $S_i$. This voltage-free transmission of system variables $u_f$ and $i_L$ is respectively depicted on the one hand by a dashed line and on the other hand by a dot-dash line.

Device 4, which generates a control signal $S_i$, includes on its input side a device 36 which determines the load on the arrester 26 and is connected at its output side to a conversion device 38. Conversion device 38 is connected via a model arrester 40 to a differentiator 42. Differentiator 42 is connected at its output side, via a comparator 44, to an evaluation unit 46. Evaluation unit 46 supplies control signal $S_i$ at its output, which is conveyed to a signal converter 6. Signal converter 6 provides a firing-angle signal $S_{alpha}$ to a firing-circuit subassembly (not illustrated) of power converter valve 8.

Device 36 for determining the load on the arrester 26 uses the actual value of current $u_f$ through arrester 26, which is available as a current-proportional voltage, to calculate an arrester power p for each instantaneous value corresponding to a U/I (voltage/current) characteristic of the arrester 26. For this purpose, device 36 contains at its input a characteristic generator 48 which is followed by a calculation device 50. A second input of calculator 50 is applied with the actual value of current $u_f$ through the arrester 26. The calculated arrester power p, from which the energy w absorbed by the artester 26 is determined by means of an integrator 52, is provided at the output of calculation device 50. The energy w absorbed by the arrester 26 at each moment can therefore be calculated, by means of device integrator 52, in response to the output p of calculation device 50. Device 36 therefore is able to calculate the energy w absorbed by the arrester 26 from the actual value or current $u_f$ through the arrester 26.

Conversion unit 38 converts the absorbed energy w into a arrester temperature $t_A$. There is a correlation between the absorbed energy w of the arrester 26 and arrester temperature $t_A$ that is given by material constants (energy absorption capacity of the material, in $J/cm^3 = Ws/cm^3$) and by the configuration of the arrester (spatial configuration vs. volume in $cm^3$). Using the data specific to each arrester, the associated arrester temperature $t_A$ can be calculated from the absorbed energy w.

In the downstream model arrester 40, or more precisely in the thermal model of arrester 26, this sufficiently accurate arrester temperature $t_A$ is corrected on the basis of thermal capacities and thermal transmission resistances, taking into account ambient temperature $T_{Um}$. This corrected temperature $t'_A$ reflects an actual arrester temperature $t'_A$ of the arrester 26 under load. This calculated arrester temperature $t'_A$ constitutes an indicator of the load on the arrester 26, and therefore on series capacitor 16 of controlled series compensation system 2.

To permit effective intervention against excessive load on controlled series compensation system 2, this calculated arrester temperature $t'_A$ must be processed as quickly and accurately as possible. For this purpose, first arrester temperature gradient Delta $t'_A$ is calculated from arrester temperature values $t_A$. This is done with differentiator 42, which determines temperature gradient Delta $t'_A$ from the arrester temperature values $t'_A$ and time intervals Delta t. For example, a shift register with a sufficient number of memory cells and a sufficiently fast processing speed can be provided as differentiator 42. Arrester temperature gradient Delta $t'_A$ indicates the abruptness of the load on the arrester 26 in the event of high-current line faults.

The downstream comparator 44 generates a binary signal $S_K$, for example a logical "high," if the arrester temperature gradient Delta $t'_A$ exceeds a predetermined limit value $T_H$. A value corresponding to a certain temperature change is selected as limit value $T_H$. This temperature change must indicate a high-current line fault with sufficient accuracy.

Figure 2:
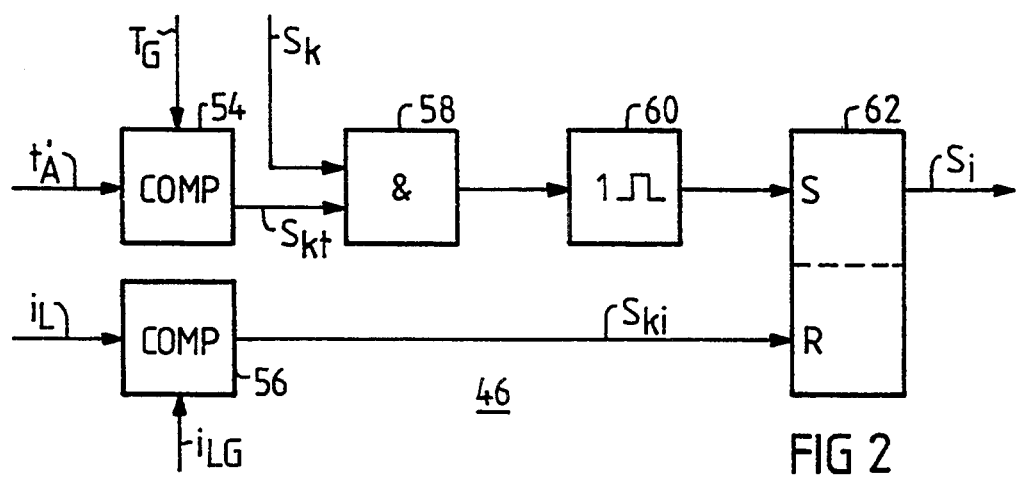
FIG. 2 depicts in more detail as a block diagram the structure of the evaluation unit of the device for generating a control signal according to FIG. 1.

Arrester temperature $t'_A$, the actual value of line current $i_L$, and the binary signal $S_K$ from the comparator 44 are processed in the downstream evaluation unit 46, the block diagram of which is depicted in more detail in FIG. 2. On the input side evaluation unit 46 includes comparators 54 and 56 to which are input arrester temperature $t'_A$ and the actual value of line current $i_L$, respectively. Comparator 54 compares the arrester temperature $t'_A$ with an upper arrester temperature $T_G$ in such a way that as long as the arrester temperature $t'_A$ is less than this absolute attester temperature $T_G$, the generated comparator signal $S_{Kt}$ at the output of comparator 52 can be a logical "high." This comparator signal $S_{Kt}$ is conveyed to an input of a downstream AND gate 58. Comparator signal $S_K$ is applied to the other input of AND gate 58 from comparator 44. AND gate 58 is connected on the output side to a time-delay switch 60. This time-delay switch 60 is also referred to as a monostable flip-flop, monoflop, univibrator, or one-shot. This circuit switches on for a predetermined period of time after an input signal, and then flips back to the inactive state. The output of this time-delay switch 60 is connected to set input S of an RS flip-flop 62. Reset input R of RS flip-flop 62 is connected in an electrically conductive manner to the output of comparator 56. Comparator 56 compares the actual value of line current $i_L$ to a limit value $i_{LG}$ in such a way that as long as the actual value of line current $i_L$ is greater than limit value $i_{LG}$, the generated comparator signal $S_{Ki}$ is a logical "low," meaning that the high-current line fault is still present. Since set input S of the RS flip-flop 62 is dominant, a logical "high" at reset input R will not cause RS flip-flop 62 to reset until a time set on time-delay switch 60, for example 2 seconds, has elapsed. As long as a logical "high" is present at set input S of RS flip-flop 62, control signal $S_i$ will also be a logical "high."

This control signal $S_i$ causes delay angle alpha in firing-circuit subassembly 6 to be set from a value $90° < < \alpha < 180°$ to $\alpha = 90°$, which causes the total impedance of controlled series compensator 2 to switch rapidly from capacitative to inductive impedance. As a result, line 10 is electrically prolonged, thus diminishing the high-current line fault. This diminution in the high-current line fault results in a reduced load on series capacitor 16 of controlled series compensator 2 and its arrester 26, eliminating the need for disconnection by means of bypass circuitry 24.

Figure 3:
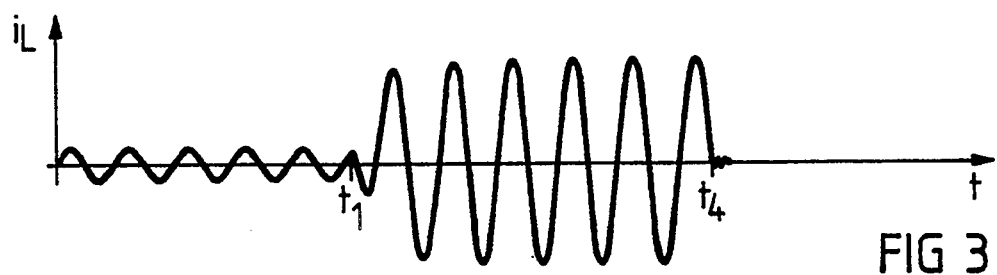
FIG. 3 and FIG. 6 each depict a graph of line current plotted against time t.
Figure 6:
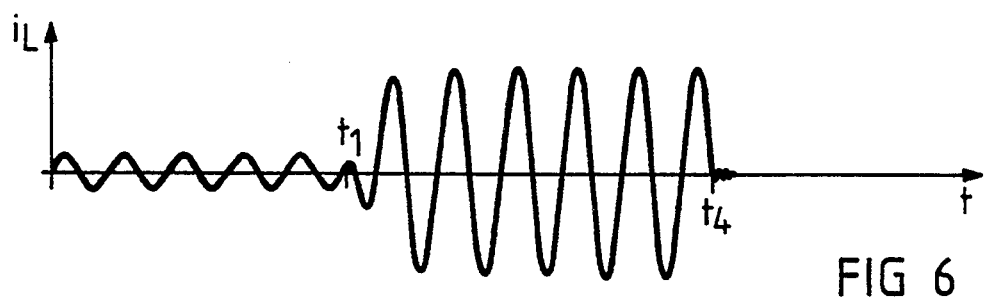

FIG. 3 and FIG. 6 each depict a graph in which line current $i_L$ is plotted against time t. A high-current line error, recognizable by the sudden increase in the amplitude of line current $i_L$, occurs at time $t_f$.

Figure 4:
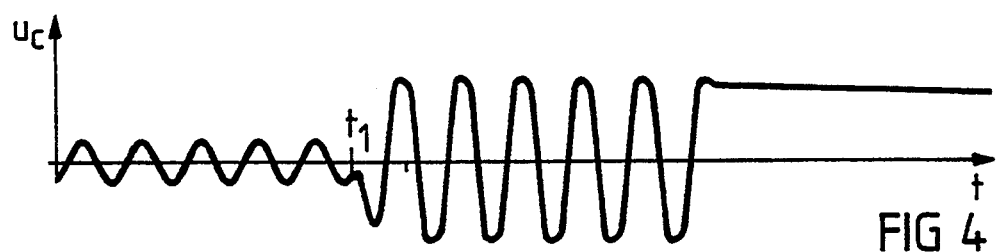
FIG. 4 and FIG. 7 each show graphs of the compensator voltage of the series compensator plotted against time t.
Figure 5:
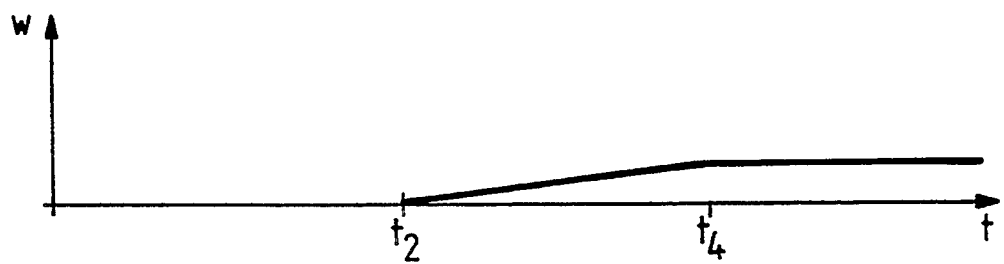
FIG. 5 and FIG. 9 each show graphs of the energy absorbed by the arrester, plotted against time t.
Figure 7:
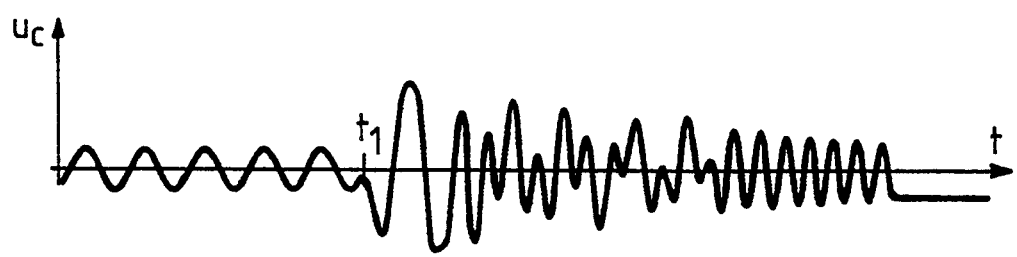

FIG. 4 and FIG. 7 depict graphs in which the associated capacitor voltage $u_c$ is plotted against time t. FIG. 4 depicts a curve without the use of the method and/or apparatus according to the present invention, while FIG. 7 refers to an instance in which the method and/or apparatus according to the present invention is used. This difference is also evident, in the curve for capacitor voltage $u_c$ according to the graph of FIG. 4, in the fact that the peaks of capacitor voltage $u_c$ are deformed. This deformation occurs when the arrester 26 very rapidly begins to conduct current at a certain voltage. The fact that arrester 26 periodically conducts current is evident from the graph of FIG. 5, in which the absorbed energy w of the arrester 26 is plotted against time t. This absorbed energy w rises with each episode of current conduction. At time $t_4$, the energy w has reached a value at which bypass 24 closes, thus short-circuiting series capacitor 16 and its parallel arrester 26 (causing controlled series compensation system 2 to go offline).

Figure 8:
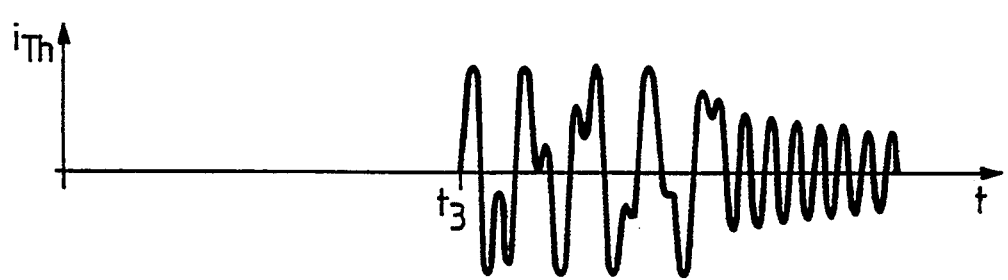
FIG. 8 illustrates a graph of valve current plotted against time t.
Figure 9:
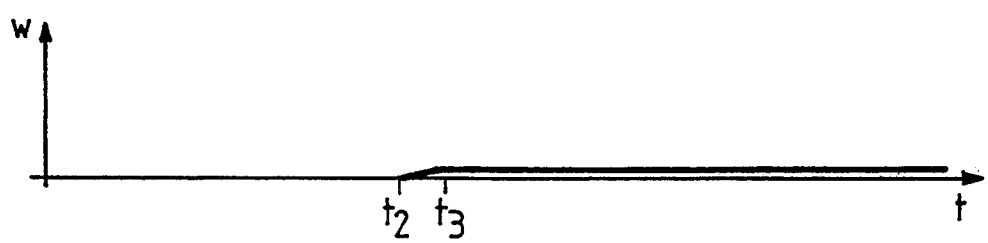

It is evident from FIG. 7 that the arrester 26 briefly conducts current twice during one period of capacitor voltage $u_c$, as a result of which the absorbed energy w of arrester 26 rises. At time $t_3$, limit value $T_H$ of the arrester temperature gradient Delta $t'_A$ has been exceeded, so that comparator signal $S_K$ changes from "low" to "high." This change in state causes evaluation unit 46 to generate a control signal $S_i$ that sets the delay angle in the firing-circuit subassembly to $\alpha = 90°$, thus triggering power conversion valve 8 so that the equivalent impedance of controlled series compensator 2 is quickly changed from capacitative to inductive (see FIG. 8). This can be seen, with reference to the curve for capacitor voltage $u_c$, from the fact that after an initial transient, the amplitude of capacitor voltage $u_c$ is approximately halved compared with the beginning of the high-current line fault, and a periodic current $i_{Th}$ flows through the reactor 18 and power converter valve 8 as illustrated in FIG. 8. It is also evident from the graph of FIG. 9 that the energy w absorbed by the arrester 26 remains constant. At time $t_4$ illustrated in FIG. 6, the high-current line fault has been reduced by the method according to the present invention to such an extent that disconnection is not necessary (see curves for capacitor voltage $u_c$ and thyristor current $i_{Th}$).

In a preferred embodiment, device 4 is implemented using a microprocessor or a microcomputer. The result of the method and apparatus according to the present invention in which, in such a preferred embodiment, device 4 which generates control signal $S_i$ is a microprocessor, is that the number of disconnections required is considerably reduced. This substantially increases the availability of controlled series compensation system 2. In a system 2 without the apparatus for implementing the process according to the present invention, a waiting time after overloads of, for example, 30 minutes, and a cooling time for arrester 26 of, for example, two hours must be observed after any actuation of bypass 24 for series capacitor 16. During this downtime, installed system 2 cannot perform its intended function.

The method according to the present invention utilizes only the current $u_I$ that flows through the arrester 26, this actual value $u_I$ being processed and analyzed with sufficient speed for each point in time. The determination of the arrester temperature gradient Delta $t'_A$, is an indicator of a sudden load on the arrester 26 during high-current line faults.

What is claimed is:

1. A method for relieving a capacitor of a controlled series compensator as a function of a load on an arrester of the controlled series compensator when high-current line faults occur, wherein the capacitor and the arrester are in a parallel connection with each other and wherein the capacitor is serially integrated to a transmission line to compensate for impedance of the transmission line, the method comprising steps of:
   a) determining an actual value of a current through the arrester of the controlled series compensator;
   b) determining a load on the attester, in the form of absorbed energy, from the determined actual value of the current through the arrester;
   c) converting the value of said absorbed energy into a temperature value for the arrester;
   d) correcting said temperature value for the arrester using a model arrester;
   e) determining an arrester temperature gradient using the corrected arrester temperature value; and
   f) generating a control signal for a power converter valve of the controlled series compensator in dependence on a minimum temperature gradient, the corrected artester temperature value, and an actual value for the line current, whereby the impedance value of the controlled series compensator is changed from a capacitative to an inductive impedance.

2. A method according to claim 1, further comprising a step of calculating the absorbed energy of the arrester by continuously calculating a power of the arrester from the determined actual value of the current through the arrester corresponding to a voltage/current characteristic of the arrester, said absorbed energy of the arrester calculated by integrating the power of the arrester.

3. A method according to claim 1, wherein the control signal is generated for at least a predetermined time period during which the determined arrester temperature gradient has exceeded a first predetermined limit value and the determined corrected arrester temperature value is less than a second predetermined limit value, such that a decrease in the actual value of the line current below a third predetermined limit value after the predetermined time period has elapsed cancels the control signal.

4. A method according to claim 3, wherein said predetermined time period is approximately two seconds.

5. A method according to claim 1, wherein said steps are performed by a microprocessor.

6. An apparatus for relieving a capacitor of a controlled series compensator as a function of a load on an arrester of the controlled series compensator when high-current line faults occur, wherein the capacitor and the arrester are in a parallel connection with each other, and wherein the capacitor is serially integrated to a transmission line to compensate for impedance of the transmission line, said apparatus comprising:
   a load determining device determining a load on the arrester by determining an actual value of a current through the arrester of the controlled series compensator and determining the load on the arrester in the form of absorbed energy, from the determined actual value of the current through the arrester;
   a conversion device converting the value of said absorbed energy into a temperature value for the arrester;
   a model arrester correcting said temperature value for the arrester;
   a differentiator determining an arrester temperature gradient using the corrected arrester temperature value; and
   a comparator and an evaluator generating a control signal for a power converter valve of the controlled series compensator in dependence on a minimum temperature gradient, the corrected arrester temperature value, and an actual value for the line current, whereby the impedance value of the controlled series compensator is changed from a capacitative to an inductive impedance.

7. An apparatus according to claim 6, further comprising means for calculating the absorbed energy of the arrester by continuously calculating a power of the arrester from the determined actual value of the current through the arrester corresponding to a current/voltage characteristic of the arrester, and means for integrating said power of the arrester to calculate the absorbed energy of the arrester.

8. An apparatus according to claim 6, wherein the control signal is generated for at least a predetermined time period during which the determined arrester temperature gradient has exceeded a first predetermined limit value and the determined corrected arrester temperature value is less than a second predetermined limit value, such that a decrease in the actual value of the line current below a third predetermined limit value after the predetermined time period has elapsed cancels the control signal.

9. An apparatus according to claim 7, wherein said predetermined time period is approximately two seconds.

10. An apparatus according to claim 6, wherein the controlled series compensator is integrated into a transmission line and the arrester of the controlled series compensator, a controllable reactor, and a serial connection of a bypass switch anct a damping circuit are each connected electrically parallel to the capacitor, wherein a current detection device is connected electrically in a series with the arrester, the current detection device connected at an input side to the apparatus for generating a control signal.

11. An apparatus according to claim 10, wherein the evaluator is connected at an input side to an output of the model arrester and to an output of a conductor current detection device.

12. An apparatus according to claim 8, wherein the controllable reactor includes at least one thyristor.

13. An apparatus according to claim 8, wherein the controllable reactor includes a coil and a power converter valve comprising two thyristors arranged anti-parallel to one another.

14. An apparatus according to claim 6, said load determining device comprising at an input side a function generator, a calculator and an integrator, an output of said function generator provided to a first input of the calculator and an output of the calculator provided to an input of the integrator, wherein the actual value of the current through the arrester is provided to an input of the function generator and to a second input of the calculator, the output of the integrator provided as the absorbed energy indicating the load on the arrester.

15. An apparatus according to claim 6, said apparatus comprising a microprocessor.

* * * * *